US 6,660,480 B2

(12) United States Patent
Ramsey et al.

(10) Patent No.: US 6,660,480 B2
(45) Date of Patent: *Dec. 9, 2003

(54) METHOD FOR ANALYZING NUCLEIC ACIDS BY MEANS OF A SUBSTRATE HAVING A MICROCHANNEL STRUCTURE CONTAINING IMMOBILIZED NUCLEIC ACID PROBES

(75) Inventors: J. Michael Ramsey, Knoxville, TN (US); Robert S. Foote, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/090,955

(22) Filed: Mar. 5, 2002

(65) Prior Publication Data

US 2002/0160405 A1 Oct. 31, 2002

Related U.S. Application Data

(63) Continuation of application No. 09/460,316, filed on Dec. 14, 1999, now Pat. No. 6,376,181, which is a continuation of application No. 08/848,553, filed on Apr. 28, 1997, now abandoned.

(51) Int. Cl.[7] .............................. C12Q 1/68; C12M 1/34
(52) U.S. Cl. ..................... 435/6; 435/285.2; 435/287.2; 436/94
(58) Field of Search ..................... 435/6, 285.2, 287.2; 436/94

(56) References Cited

U.S. PATENT DOCUMENTS

| 4,908,112 | A | | 3/1990 | Pace |
| 5,073,239 | A | | 12/1991 | Hjerten |
| 5,092,973 | A | | 3/1992 | Zare et al. |
| 5,110,431 | A | | 5/1992 | Moring |
| 5,126,022 | A | | 6/1992 | Soane et al. |
| 5,132,012 | A | | 7/1992 | Miura et al. |
| 5,141,621 | A | | 8/1992 | Zare et al. |
| 5,180,480 | A | | 1/1993 | Manz |
| 5,250,263 | A | | 10/1993 | Manz |
| 5,296,114 | A | | 3/1994 | Manz |
| 5,376,252 | A | | 12/1994 | Ekstrom et al. |
| 5,585,069 | A | | 12/1996 | Zanzucchi et al. |
| 5,603,351 | A | | 2/1997 | Cherukuri et al. |
| 5,605,662 | A | | 2/1997 | Heller et al. |
| 5,632,876 | A | | 5/1997 | Zanzucchi et al. |
| 5,661,028 | A | | 8/1997 | Foote |
| 5,759,779 | A | | 6/1998 | Dehlinger |
| 5,770,029 | A | * | 6/1998 | Nelson et al. ............... 204/604 |
| 5,804,384 | A | | 9/1998 | Muller et al. |
| 5,858,195 | A | | 1/1999 | Ramsey |
| 6,001,229 | A | * | 12/1999 | Ramsey ....................... 204/451 |
| 6,007,690 | A | * | 12/1999 | Nelson et al. ............... 204/601 |
| 6,010,607 | A | * | 1/2000 | Ramsey ....................... 204/435 |
| 6,010,608 | A | * | 1/2000 | Ramsey ....................... 204/453 |
| 6,056,859 | A | * | 5/2000 | Ramsey et al. .............. 204/451 |
| 6,062,261 | A | * | 5/2000 | Jacobson et al. ........... 137/827 |
| 6,074,827 | A | | 6/2000 | Nelson et al. |
| 6,110,343 | A | * | 8/2000 | Ramsey et al. .............. 204/601 |
| 6,120,666 | A | * | 9/2000 | Jacobson et al. ........... 204/452 |
| 6,231,737 | B1 | * | 5/2001 | Ramsey et al. .............. 204/451 |
| 6,475,363 | B1 | * | 11/2002 | Ramsey ....................... 204/451 |

FOREIGN PATENT DOCUMENTS

| EP | 0356160 | 2/1990 |
| EP | 0620432 | 4/1993 |
| GB | 2191110 | 12/1987 |
| WO | WO 94/05414 | 3/1994 |
| WO | WO 95/12808 | 5/1997 |

OTHER PUBLICATIONS

C. Effenhauser et al., "Glass Chips for High Speed Capillary Electrophoresis Separations with Submicrometer Plate Heights", Anal. Chem., 65:2637–2642 (1993).
D. Jed Harrison et al., "Capillary Electrophoresis and Sample Injection Systems Integrated on a Planar Glass Chip", Anal. Chem., 64:1926–1932 (1992).
M. Deml et al., "Electric Sample Splitter for Capillary Zone Electrophoresis", Journal of Chromatography, 320:159–165 (1985).
D. Jed Harrison et al., "Micromachining a Minaturized Capillary Electrophoresis–Based Chemical Analysis System on a Chip", Science, 261:895–897 (1993).
Dasgupta et al., Anal. Chem, 66:1792–98 (Jun. 1994).
Wilding et al., Clin. Chem. 40(1), 43–47 (1994).
Wilidng et al., Clin. Chem. 40(9), 1815–1818 (1994).

* cited by examiner

Primary Examiner—Kenneth R. Horlick
(74) Attorney, Agent, or Firm—Dann Dorfman Herrell and Skillman, P.C.

(57) ABSTRACT

A method and apparatus for analyzing nucleic acids includes immobilizing nucleic probes at specific sites within a microchannel structure and moving target nucleic acids into proximity to the probes in order to allow hybridization and fluorescence detection of specific target sequences.

26 Claims, 5 Drawing Sheets

METHOD FOR ANALYZING NUCLEIC ACIDS BY MEANS OF A SUBSTRATE HAVING A MICROCHANNEL STRUCTURE CONTAINING IMMOBILIZED NUCLEIC ACID PROBES

CROSS-REFERENCE TO RELATED APPLICATIONS

This application is a continuation of U.S. patent application Ser. No. 09/460,316, filed Dec. 14, 1999, U.S. Pat. No. 6,376,181 which is a continuation of U.S. patent application Ser. No. 08/848,553, filed Apr. 28, 1997, now abandoned.

This invention was made with government support under Contract No. DE-AC05-840R21400 awarded by the U.S. Department of Energy to Lockheed Martin Energy Systems, Inc. and the government has certain rights in this invention.

BACKGROUND OF THE INVENTION

1. Field of The Invention

The present invention relates generally to medical and/or biological testing and devices for performing same, and more particularly, to a method and apparatus for analyzing minute amounts of nucleic acids for the presence of specific nucleotide sequences. Single-strand DNA probes are bound to specific regions of microchannels in a glass microchip device. Sub-microliter volumes of nucleic acid solutions, buffers and other reagents are transported through the channels under electrokinetic or hydraulic control. Hybridization of target nucleic acid sequences to complementary probes is detected using either fluorescent labels or intercalating fluorescent dyes.

2. Description of the Related Art

Hybridization analysis is typically performed in microtiter plate wells or on planar surfaces that contain arrays of DNA probes. Chemical manipulations are required to bring about a hybridization test and to detect the results. These manipulations presently include washing or dipping planar arrays into the appropriate chemicals.

The aforementioned procedures suffer from many drawbacks. For example, they are wasteful of expensive reagents and limited sample volumes. Moreover, they are generally not compatible with efficient automation strategies and thus tend to be time consuming.

A continuing need exists for methods and apparatuses that limit the use of expensive reagents and priceless samples, while simplifying the overall procedures to require smaller samples and fewer processing steps.

SUMMARY OF THE INVENTION

An object of the present invention is to provide a method and apparatus for analyzing nucleic acids which simplifies chemical manipulations required to bring about a hybridization test when performing DNA diagnostics in biomedical, forensic, and research applications.

Another object of the present invention is to provide a method and apparatus for analyzing nucleic acids which minimizes the use of expensive reagents and limited sample volumes.

Another object of the present invention is to provide a method and apparatus for analyzing nucleic acids which avoids the necessity of pre-labeling a target DNA and increases the sensitivity of hybrid detection by reducing background fluorescence due to non-specific surface adsorption of labeled target DNA.

Still another object of the present invention is to provide a method and apparatus for analyzing nucleic acids which significantly extend the usefulness of hybridization diagnostics by allowing its application to much smaller samples and facilitating automated processing.

These and other objects are met by providing an apparatus for analyzing nucleic acids which includes a microchip having a microchannel structure formed therein, at least one portion of the microchannel structure having at least one site capable of affixing thereto a probe, and a plurality of reservoirs in communication with the microchannel structure for introducing at least one of, or a mixture of, a reagent, analyte solution, and buffer.

In another aspect of the invention, a method of analyzing nucleic acids includes bonding oligonucleotide probes to a microchannel formed in a microchip, adding target nucleic acids and fluorescent stains to the microchannel, and detecting hybridization by fluorescence staining of double-stranded DNA.

These together with other objects and advantages which will be subsequently apparent, reside in the details of construction and operation as more fully hereinafter described and claimed, with reference being had to the accompanying drawings forming a part hereof, wherein like numerals refer to like elements throughout.

DETAILED DESCRIPTION OF THE PREFERRED EMBODIMENTS

Figure 1:
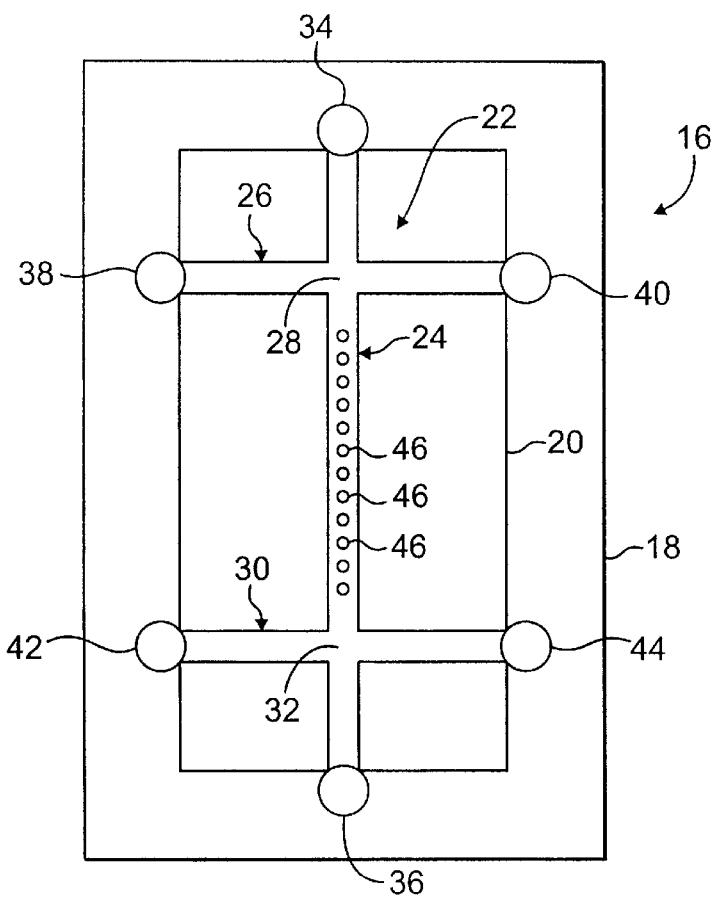
FIG. 1 is a schematic view of an apparatus for analyzing nucleic acids according to a preferred embodiment of the present invention.

Referring to FIG. 1, a microchip 16 includes a glass substrate 18 and a cover plate 20 which covers a microchannel structure 22 formed in the upper surface of the substrate 16. The cover plate 20 is permanently bonded to the substrate 18. Both the substrate 18 and cover plate 20 are preferably made of clear glass, and the substrate may preferably be made from a standard microscope slide. Alternative construction materials could include plastics (such as polypropylene, polycarbonate, or polymethylmethacrylate), silicon, or sapphire.

The microchannel structure 22 is formed using standard photolithographic techniques, and includes a longitudinal microchannel manifold portion 24, a first transverse microchannel portion 26 forming an intersection 28 with the longitudinal portion 24, and a second transverse microchannel portion 30 forming an intersection 32 with the longitudinal portion 24.

First and second reservoirs 34 and 36 are in fluid communication with opposite ends of the longitudinal portion 24. The opposite ends act as ports to introduce the contents of the reservoirs 34 and 36 into the microchannel structure 22. Each reservoir can be a cylindrical container open at its opposite axial ends, with the ends of the longitudinal portion 24 being in fluid communication with the bottom of the container.

Third and fourth reservoirs 38 and 40 are in fluid communication with opposite ends of the first transverse portion 26. The opposite ends act as ports to introduce the contents of the reservoirs 38 and 40 into the microchannel structure 22. Each reservoir 38 and 40 is similar in construction to the other reservoirs, with the ends of the first transverse portion being in fluid communication with the bottom of each respective reservoir 38 and 40.

Fifth and sixth reservoirs 42 and 44 are in fluid communication with opposite ends of the second transverse portion 30. The opposite ends act as ports to introduce the contents of the reservoirs 42 and 44 into the microchannel structure 22. Each reservoir 42 and 44 is similar in construction to the other reservoirs, with the ends of the second transverse portion being in fluid communication with the bottom of each respective reservoir 42 and 44.

One or more types of single-stranded DNA probes 46 are attached at individual sites within the microchannel portion 24 of the microchannel structure 22. The design and fabrication of microchips and the electrokinetic transport of fluids through the microchannels is described in U.S. Ser. No. 08/283,769, filed Aug. 1, 1994, hereby incorporated by reference. The microchips described therein include planar, glass substrates into which the microchannels are etched photolithographically. The reservoirs typically hold analyte solutions, buffers, reagents, etc. Typical microchannel dimensions are 10 $\mu$m by 50 $\mu$m (depth×width), although channel widths of 1 $\mu$m to >100 $\mu$m and channel depths of <1 $\mu$m to >100 $\mu$m may be used. Voltages are applied to solutions as described in the aforementioned application to produce electroosmotic flow of fluids or electrophoretic migration of charged species through the channels. Alternatively, pressure (or vacuum) may be applied to one or more fluid reservoirs to cause reagent flow through the channels.

Figure 2:
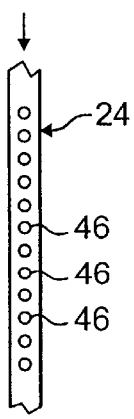
FIGS. 2 and 3 are schematic views of different arrangements of nucleic acid hybridization probes in microchannels.
Figure 3:
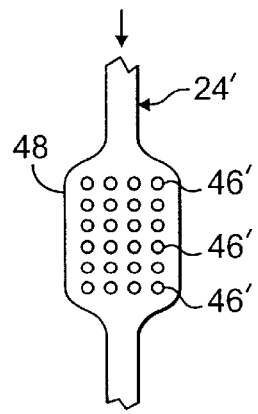

The individual DNA probes may be arranged in a linear pattern, as shown in FIG. 2. An alternative embodiment is shown in FIG. 3, wherein the 46' are arranged in a two-dimensional array in a widened area 48 of the channel portion 24'. Fluid flow is in the direction indicated by arrows.

Typically, oligonucleotide probes ten to thirty nucleotides long are used for hybridization analysis, although much longer probes, such as DNA restriction fragments or cDNA sequences of >100 nucleotide length, may be used in certain applications.

Oligonucleotide probes may be immobilized by covalent chemical linkage to the surface. In general, such linkage involves derivatization of the glass surface with a silane coupling agent, such as 3-aminopropyltriethoxysilane or 3-glycidoxypropyltrimethoxysilane. An oligonucleotide probe bearing an alkylamine group at the 5' or 3' end may then be linked to the surface by direct reaction of its terminal amine with a silane epoxy group or by cross linking the silane and oligonucleotide amines using glutaraldehyde or other amine-reactive bi-functional compounds.

Other immobilization method may also be used. For example, surface-immobilized avidin or streptavidin may be used to bind biotinylated probes. Non-covalently adsorbed oligonucleotides on glass surfaces have also been shown to hybridize to target sequences.

In the preferred fabrication method, the probes are attached to the open microchip channels and the cover plate is then bound to the substrate by a low temperature technique which does not damage the biomolecules. Such a low temperature bonding technique is described in application Ser. No. 08/645,497, abandoned, entitled "Low Temperature Material Bonding Technique" by J. M. Ramsey, R. S. Foote, and H. Wang, which is incorporated herein by reference. Individual probes may be applied to specific sites in the channels by micro-pipeting or other means, such as ink-jet printing. The separation of individual probes may be facilitated by preparing the surface with a pattern of reactive, hydrophilic sites separated by non-reactive, hydrophobic areas. For example, the glass surface may be treated with an alkyltrialkoxysilane to produce a non-reactive, hydrophobic surface. Photolithography and chemical etching or laser ablation may be used to remove the silane layer and expose the glass substrate in a pattern of separated spots. These spots may then be treated with a silane coupling agent as described above to produce reactive, hydrophilic spots. An aqueous probe solution applied to an individual spot would be confined to its hydrophilic site and thus prevented from mixing with different probe solutions in adjacent spots. The intervening hydrophobic regions would also prevent probe mixing in the case of the other immobilization methods described above.

Alternatively, the probes may be attached to specific sites in the channels after standard high-temperature cover plate bonding. Three methods of achieving this are provided as examples:

(1) The functional group of the silane linker (e.g., the amino function of 3-aminopropylsilane)may be blocked with a photolabile protective group. The silane linkers are then de-protected at specific positions in the channel by exposure to light through the cover plate using a photolithographic mask or focused beam. Cross linkers and probes passed through the channel would react only at de-protected sites. A series of separate de-protection and addition steps are used to attach a number of different probes to individual sites.

(2) An array of oligonucleotide probes may be photochemically synthesized in situ in a parallel fashion.

(3) A channel manifold may be designed to allow the addition of an individual probe to a given branch or segment of the manifold by controlling fluid flows.

Figure 4:
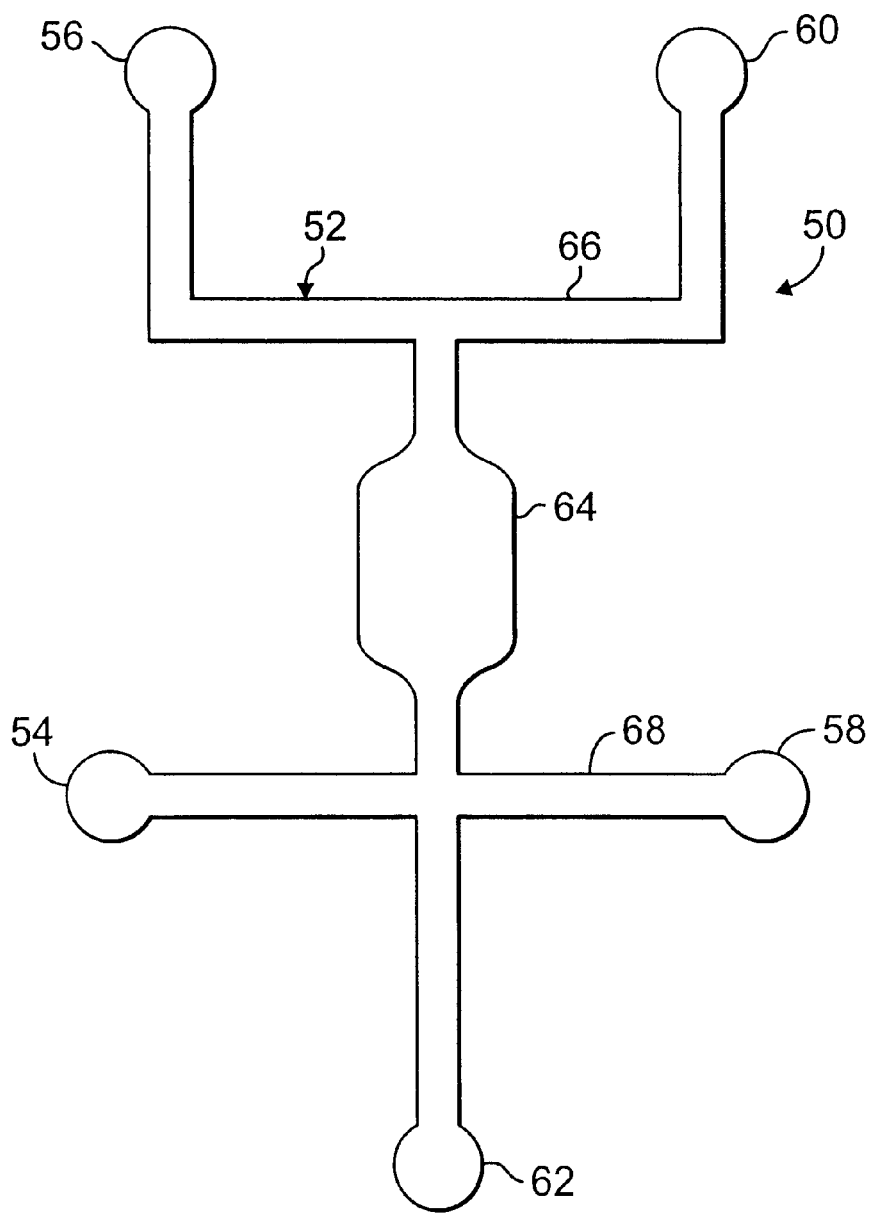
FIG. 4 is a schematic view of a microchip and microchannel structure according to another preferred embodiment of the present invention.

In the preferred methodology, nucleic acids, buffers and dyes are electrokinetically driven through the microchannels containing the immobilized probes. For example, the following sequence of operations can be used with the device schematically illustrated in FIG. 4. As seen in FIG. 4, a microchip 50 includes a microchannel structure 52 connected to a nucleic acid sample reservoir 54, a buffer reservoir 56, a dye reservoir 58, dye buffer reservoir 60, and waste reservoir 62. A hybridization chamber 64 is disposed in the microchannel structure 52 between first and second transverse portions 66, 68 of the microchannel structure.

A voltage is applied between reservoir 54 which contains the nucleic acid sample being analyzed and reservoir 56 containing nucleic acid buffer. For buffers containing a high NaCl concentration (desirable for rapid nucleic hybridization) the polarity of reservoir 56 is positive relative to reservoir 54 and the negatively charged nucleic acids electrophoretically migrate from reservoir 54 to reservoir 56, passing through the hybridization chamber 64. Alternatively, a nucleic acid solution containing a low salt concentration may be electroosmotically transported into the hybridization chamber by applying a positive voltage at reservoir 54 relative to reservoir 56. Because electroosmotic flow toward reservoir 56 is high relative to electrophoretic migration toward the positive electrode, the net movement of nucleic acids will be toward reservoir 56 in the later case. The use of electroosmotic flow versus electrophoretic migration will depend on a number of factors, and may vary depending on the type of sample being analyzed. The term "electrokinetic transport" includes both electroosmotic flow and electrophoretic migration.

After the DNA sample reaches equilibrium over the probe sites, the voltage may be discontinued while hybridization occurs. A double-strand-DNA-specific (dsDNA-specific) fluorescent dye is then electrokinetically transported through the hybridization chamber 64 by applying voltages to fluid reservoir 58 which contains a dye and reservoir 60 containing a dye buffer. Because high salt concentrations are not normally required or desirable for this step, electroosmotic flow is the preferred method of dye addition and the polarity of reservoir 58 will normally be positive relative to reservoir 60. Several fluorescent double-strand-specific nucleic acid stains are commercially available. Many of these stains are positively charged so that their electrophoretic migration will be in the same direction as the electroosmotic flow.

Alternatively, the nucleic acids being analyzed may be pre-labeled with fluorescent groups by well known procedures. Although this later method can lead to higher background fluorescence, it may be preferred in cases where probes contain self-complementary sequences that can result in stable duplex formation and dye binding by the probe itself.

Variations in the chip design and analysis procedure are possible. For example, electrokinetically driven washing steps may be included before and/or after the dye addition step by applying appropriate voltages between the buffer reservoirs and a waste reservoir 62. Nucleic acid and dye solutions might also be added simultaneously to the hybridization chamber. As an alternative to electrokinetically driven fluid manipulation, hydraulic pressure or vacuum may be applied to appropriate reservoirs to control the flow of solutions through the microchannels.

After completion of the hybridization and dsDNA staining steps, if used, the hybridization chamber is examined for the presence of fluorescently labeled sites by illumination with exciting light through the cover plate. An epifluorescence microscope and CCD camera may be used, as described below, to obtain a fluorescence image of the entire chamber or portion thereof. Scanning confocal fluorescence microscopy may also be used.

The following examples incorporate the apparatus and methodology of the present invention. Each involves the steps of (1) covalently bonding oligonucleotide probes to microchannels, (2) adding target nucleic acids and fluorescent stains to microchannels by electrokinetic flow, (3) detecting hybridization by fluorescence staining of double-stranded DNA, and (4) discriminating target and non-target nucleic acids.

EXAMPLE 1

A 16-mer oligodeoxynucleotide probe sequence containing a 5'-(6-aminohexyl)phosphate [$H_2N-CH_2)_6$-5'-pCGGCACCGAGTTTAGC-3'] [SEQ. ID NO: 1] was covalently attached to the hybridization chamber of a prototype microchip similar to that shown in FIG. 4 by glutaraldehyde cross linking with the 3-aminopropylsilane-derivatized glass surface. A complementary 16-mer (target sequence) oligodeoxynucleotide in 6×SSC buffer was then electrophoretically added to the hybridization chamber by applying 0.5 kV between reservoir 56 and reservoir 54 (positive electrode at reservoir 54) for thirty minutes. A dsDNA-specific fluorescent dye (TOTO-1, Molecular Probes) in 10 mM Tris-borate buffer, pH 9.2, was then electroosmotically added to the chamber by applying 1.0 kV between reservoir 60 and reservoir 58 for 30 minutes. The chip was examined by video microscopy using laser excitation (514 nm) of fluorescence. Bright fluorescence due to the dsDNA-bound dye was observed in the hybridization chamber relative to channels not exposed to the target DNA. The image was recorded on video tape.

In a subsequent similar experiment using the dsDNA specific dye, PicoGreen (Molecular Probes), quantification by CCD imaging and analysis showed a 10-fold increase in fluorescence intensity when staining was carried out after hybridization of the target DNA, relative to the intensity observed by staining prior to the hybridization step.

EXAMPLE 2

Figure 5:
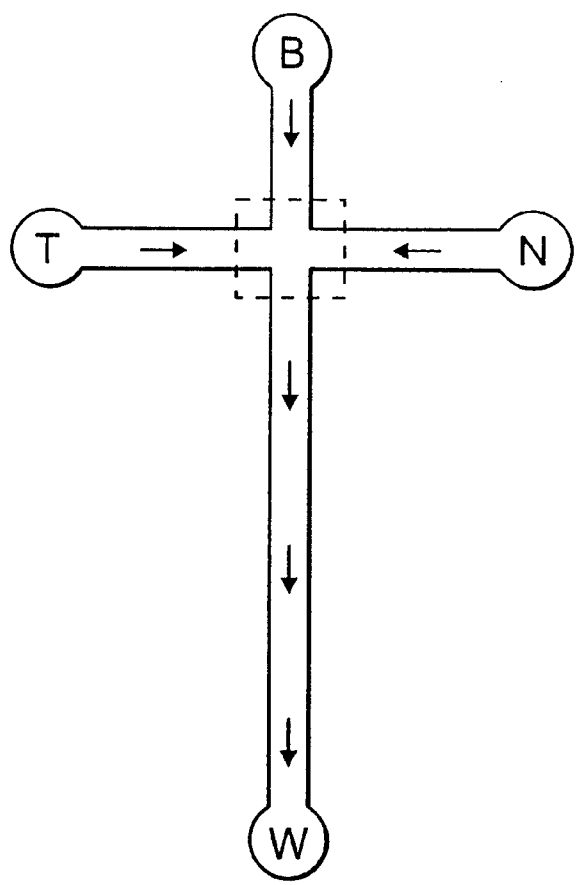
FIG. 5 is a schematic view of a microchip of the present invention.
Figure 6:
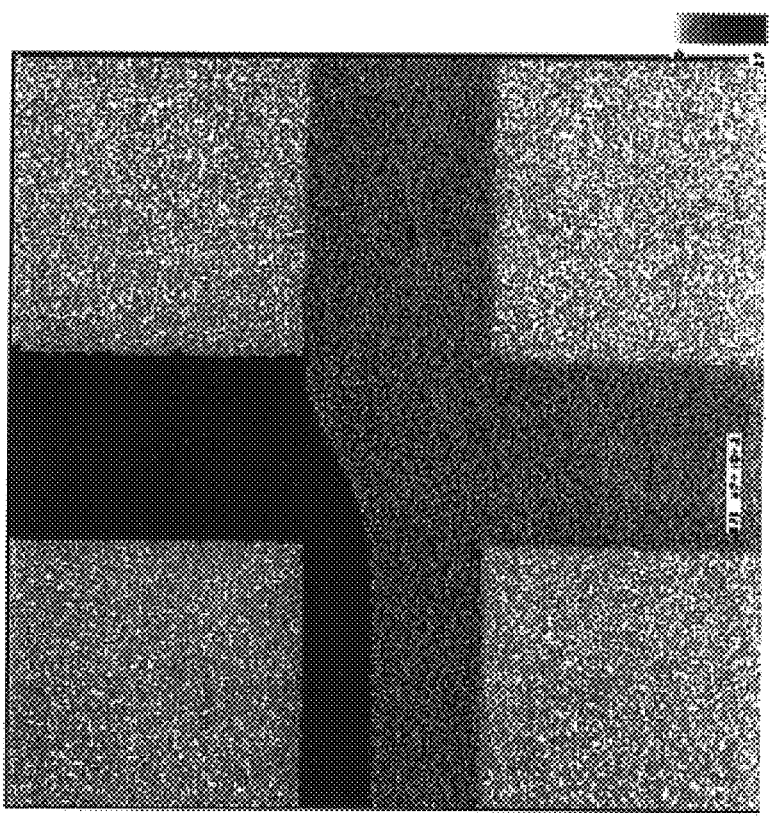
FIG. 6 is a photomicrograph showing discrimination of target and non-target DNA at the intersection of microchannels in the inset area of FIG. 5 after dsDNA staining with fluorescent dye.

The 16-mer oligonucleotide probe of Example 1 was uniformly bound to the channels of a cross-channel chip shown schematically in FIG. 5 by glutaraldehyde cross-linking. Solutions (50 μM) of the complementary (target sequence) 16-mer oligodeoxynucleotide (T) and a non-complementary (non-target sequence) 16-mer oligodeoxynucleotide (N) in phosphate-buffered saline (PBS) were then added to separate channels as indicated in FIG. 5, by applying suction at W for 10 minutes. The channels were then washed with buffer and dsDNA-specific dye solution (PicoGreen, Molecular Probes) was added to all channels for five minutes. The cross-channel intersection was examined by epifluorescence microscopy using a mercury lamp illumination source and FITC filters. A 1.0 second CCD exposure, shown in FIG. 6 as the insert of the broken line area of FIG. 5, showed intense fluorescence (dark regions) in the channel exposed to target DNA relative to that of channels exposed to non-target DNA or buffer.

In a similar experiment using laser induced fluorescence imaging, as described in application Ser. No. 08/800,241, U.S. Pat. No. 6,056,859, entitled "Method and Apparatus for Staining Immobilized Nucleic Acids" by J. M. and SC Jacobson R. S. Foote, incorporated herein by reference, signal intensity from channels exposed to target DNA was 10-fold greater than from channels exposed to non-target DNA or buffer.

EXAMPLE 3

Figure 7:
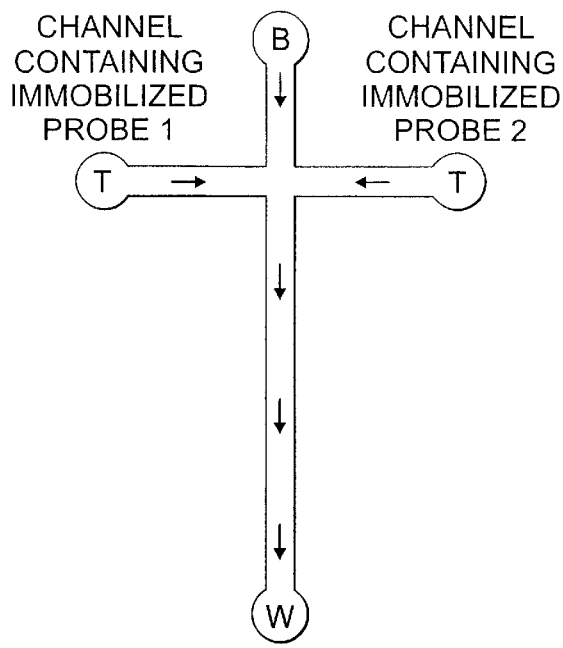
FIG. 7 is a schematic view of another apparatus for analyzing nucleic acids according to a preferred embodiment of the present invention.

Two 16-mer probes [$H_2N-(CH_2)_6$-5'-GCTAAACTCGGTGCCG-3' (SEQ ID NO: 2) and [$H_2N-(CH_2)_6$-5'-pCGGCACCGAGTTTAGC-3' (SEQ ID NO: 2) were immobilized in separate channels of a cross-channel chip as indicated in FIG. 7. In FIG. 7, the "T" reservoir is for target DNA, "B" is for PBS buffer and "W" is for waste.

Figure 8:
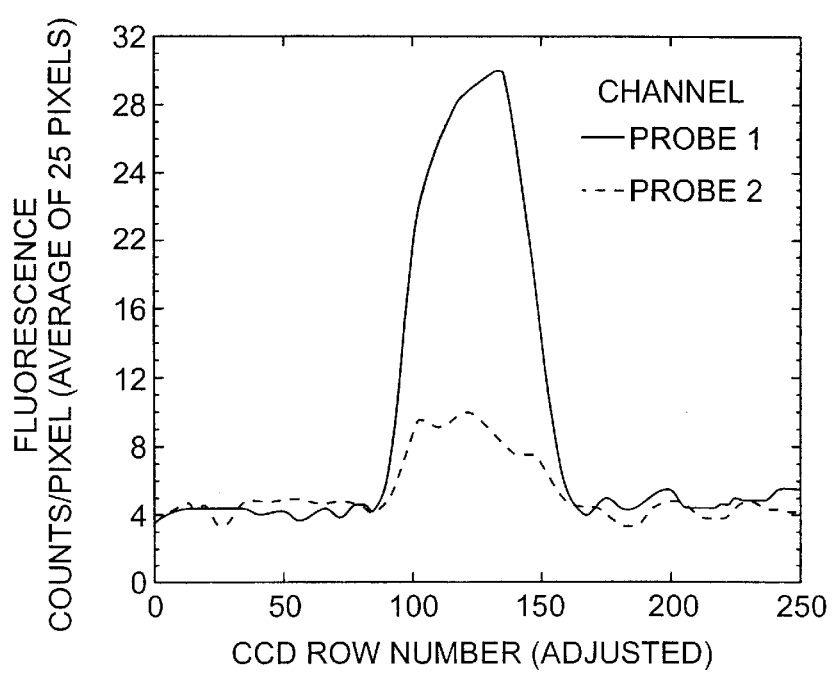
FIG. 8 shows fluorescence image profiles of two probe channels after ds-DNA staining with fluorescent dye.

A solution of 16-mer oligonucleotide (50 nM oligonucleotide in PBS) complementary to Probe 1 was induced to flow through both channels for a total of 15 minutes by applying a vacuum at W. The channels were then washed with buffer and treated with a ds-DNA specific dye solution (PicoGree, Molecular Probes) for two minutes. After washing with 10 mM Tris-HCL (pH 8), one mM EDTA (TE) buffer for one minute, the channels were examined for laser-induced fluorescence using an argon ion laser at 488 nm and 100 milliwatts power. Quantitation by CCD imaging, shown in FIG. 8, shows a 4 to 5-fold greater fluorescence in the Probe 1 channel than in the Probe 2 channel after subtraction of the background signal.

According to the above methods and apparatuses, hybridization analysis can be performed in a microchip structure that requires low instrumentation space and extremely low sample/reagent volumes. The electrokinetic transport of samples and reagents facilitates automation of sample/reagent manipulations. Moreover, the detection of hybridization using double-strand DNA-specific fluorescent dyes eliminates the target DNA labeling step associated with prior art techniques and increases detection sensitivity.

While the examples referred to above describe nucleic acid probes, the methodology and apparatuses could also be used for other uses including, but not limited to, immobilized antibodies for micro-immunoassays. Numerous biomedical applications can be envisioned.

While the various embodiments have referred to specific reservoirs containing specific reagents, buffers or samples, mixtures of two or more substances can be contained in individual reservoirs. For example, a reservoir can contain a mixture of reagent and buffer, buffer and sample, etc.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described and accordingly, all suitable modifications and equivalents may be resorted to, falling within the scope of the invention.

What is claimed is:
1. A method for analyzing nucleic acids comprising the steps of:
 a. providing a substrate having a microchannel structure, at least one nucleic acid probe being affixed to at least one portion of said microchannel structure;
 b. electrokinetically transporting an analyte nucleic acid to said at least one probe; and,
 c. analyzing for the presence of said analyte nucleic acid hybridized to said at least one probe.

2. A method according to claim 1, wherein the step of electrokinetically transporting an analyte nucleic acid includes electroosmotically transporting a solution containing said analyte nucleic acid through said microchannel structure.

3. A method according to claim 1, wherein the step of electrokinetically transporting an analyte nucleic acid includes electrophoretically migrating said analyte nucleic acid through a solution contained in said microchannel structure.

4. A method according to claim 1, wherein said microchannel structure is in fluid communication with at least two fluid reservoirs and the step of electrokinetically transporting an analyte nucleic acid includes applying electrical voltages to said at least two fluid reservoirs, one of said reservoirs containing a solution of said analyte nucleic acid.

5. A method according to claim 1, wherein the step of analyzing for the presence of said analyte nucleic acid hybridized to said at least one probe includes electrokinetically transporting a flourescent label to the probes and detecting fluorescence emission from said label.

6. A method according to claim 4, wherein said fluorescent label is an intercalating dye.

7. A method according to claim 1, wherein said analyte nucleic acid is fluorescently labeled and the step of analyzing for the presence of said analyte nucleic acid hybridized to said at least one probe comprises detecting fluorescence emission from said label.

---

SEQUENCE LISTING

<160> NUMBER OF SEQ ID NOS: 2

<210> SEQ ID NO 1
<211> LENGTH: 16
<212> TYPE: DNA
<213> ORGANISM: Artificial Sequence
<220> FEATURE:
<223> OTHER INFORMATION: Sequence source:/note="synthetic oligonucleotide construct containing a 6-amino hexyl phosphate modification at the 5' end"

<400> SEQUENCE: 1
cggcaccgag tttagc                                                    16

<210> SEQ ID NO 2
<211> LENGTH: 16
<212> TYPE: DNA
<213> ORGANISM: Artificial Sequence
<220> FEATURE:
<223> OTHER INFORMATION: Sequence source:/note="synthetic oligonucleotide construct containing a 6-amino-hexyl phosphate modification at the 5' end"

<400> SEQUENCE: 2
gctaaactcg gtgccg                                                    16

8. A method according to claim 1, additionally comprising the step of washing said at least one probe following the transport of analyte nucleic acids to said at least one probe.

9. A method according to claim 4, additionally comprising the step of washing said at least one probe following the transport of said fluorescent label to said at least one probe.

10. A method according to claim 8, wherein said washing step comprises electrokinetically transporting buffer through the microchannel containing said at least one probe.

11. A method according to claim 9, wherein said washing step comprises electrokinetically transporting buffer through the microchannel containing said at least one probe.

12. An apparatus for analyzing nucleic acid comprising:
   a. a substrate with a microchannel structure formed therein, said microchannel structure having a probe channel and at least two end portions;
   b. at least one nucleic acid probe affixed within said probe channel intermediate said two end portions of said microchannel structure;
   c. a cover plate affixed to the substrate, said cover plate and said substrate cooperating to enclose said at least one nucleic acid probe;
   d. at least two fluid reservoirs in fluid communication with said end portions of said microchannel structure, one of said reservoirs adapted to contain a fluid comprising at least one substance from the group consisting of analyte nucleic acid and fluorescent label and, optionally, a buffer;
   e. a source of electrical voltage applied to said reservoirs for effecting electrokinetic transport of said at least one fluid from said one reservoir through said microchannel structure to a probe site adjacent to said at least one probe in said probe channel; and
   f. a detector for detecting the presence of said at least one fluid at said probe site.

13. An apparatus according to claim 12, wherein said at least one fluid comprises an intercalating fluorescent dye, and said detector is operable to detect fluorescence emission from said dye.

14. An apparatus according to claim 12, wherein said at least two fluid reservoirs include a first reservoir containing a solution of said analyte nucleic acid and a second reservoir containing a solution of a fluorescent label.

15. An apparatus according to claim 14, wherein one end portion of said microchannel structure is connected to both said first reservoir and said second reservoir, said voltage source effecting transport of said fluids to said at least one nucleic acid probe in said probe channel.

16. An apparatus according to claim 14, wherein said at least two fluid reservoirs further include a third reservoir containing a wash buffer, one end portion of said microchannel structure being connected to said first, said second and said third reservoirs, said voltage source effecting transport of said fluids to said at least one nucleic acid probe in said probe channel, and transport of said wash buffer through said probe channel and past said at least one nucleic acid probe.

17. An apparatus according to claim 14, wherein said at least two fluid reservoirs further include a third reservoir containing a wash buffer, one end portion of said microchannel structure being connected to said first and said second reservoirs, the other end portion of said microchannel structure being connected to said third reservoir, said at least two fluid reservoirs further including at least two waste reservoirs, said waste reservoirs being connected to said probe channel at said opposite end portions, said voltage source, effecting transport of said analyte nucleic acid and said fluorescent label to said at least one nucleic acid probe in one direction in said probe channel, and transport of said wash buffer in the opposite direction through said probe channel and past said at least one nucleic acid probe.

18. An apparatus according to claim 12, wherein said at least two fluid reservoirs include a first reservoir containing a solution of said analyte nucleic acid, a second reservoir containing a solution of a fluorescent label, and at least one additional waste reservoir.

19. An apparatus according to claim 18, wherein one end portion of said microchannel structure is connected to both said first reservoir and said second reservoir, and another end portion of said microchannel structure is connected to said at least one additional waste reservoir, said voltage source effecting transport of said analyte nucleic acid and said fluorescent label through said probe channel and into said at least one additional waste reservoir.

20. An apparatus according to claim 12, wherein said at least two fluid reservoirs include a first reservoir containing a solution of said analyte nucleic acid, a second reservoir containing a solution of an intercalating dye providing a fluorescent label, and at least one additional waste reservoir, one end portion of said microchannel structure being connected to both said first reservoir and said second reservoir, and another end portion of said microchannel structure being connected to said at least one additional waste reservoir, said voltage source applying an electrical potential between said second reservoir and said at least one additional reservoir, effecting transport of said analyte nucleic acid and said dye through said probe channel and into said at least one additional waste reservoir.

21. An apparatus according to claim 20, wherein said at least one additional waste reservoir comprises an analyte waste reservoir and a separate dye waste reservoir.

22. An apparatus according to claim 20, wherein said at least one additional waste reservoir comprises a combined analyte and dye waste reservoir.

23. An apparatus according to claim 12, wherein said at least two fluid reservoirs include a first reservoir containing a solution of said analyte nucleic acid, a second reservoir containing a wash buffer, and at least one additional waste reservoir, one end portion of said microchannel structure being connected to both said first reservoir and said second reservoir, and another end portion of said microchannel structure being connected to said at least one additional waste reservoir, said voltage source applying an electrical potential between said second reservoir and said at least one additional reservoir, effecting transport of said analyte nucleic acid and said wash buffer through said probe channel and into said at least one additional waste reservoir.

24. An apparatus according to claim 23, wherein said at least one additional waste reservoir comprises an analyte nucleic acid waste reservoir and a separate wash buffer waste reservoir.

25. An apparatus according to claim 23, wherein said at least one additional waste reservoir comprises a combined analyte nucleic acid and wash buffer waste reservoir.

26. An apparatus for analyzing nucleic acids comprising:
   a. a substrate having a microchannel structure formed therein said microchannel structure including at least two end portions and a number of different nucleic acid probes being immobilized at multiple probe sites within said microchannel structure, each of said different nucleic acid probes being immobilized at a discrete probe site;
   b. a cover plate affixed to the substrate, said cover plate and said substrate cooperating to enclose said probe sites;

c. at least two fluid reservoirs in fluid communication with said end portions of said microchannel structure, one of said reservoirs adapted to contain a fluid comprising at least one substance from the group consisting of analyte nucleic acid and fluorescent label and, optionally, a buffer;

d. a source of electrical voltage applied to said reservoirs for effecting electrokinetic transport of said at least one fluid from said one reservoir through said microchannel structure to a nucleic acid probe site; and e. a detector for detecting the presence of said at least one fluid at one of said nucleic acid probe sites.

* * * * *